United States Patent [19]

Murphy

[11] 3,775,993
[45] Dec. 4, 1973

[54] ART OF EVAPORATIVE COOLING

[75] Inventor: Edmund Murphy, Ortonovo, Italy

[73] Assignee: Ruckluft Patent AG, Luzern, Switzerland

[22] Filed: May 31, 1972

[21] Appl. No.: 258,364

[30] Foreign Application Priority Data
June 4, 1971   Great Britain............... 18,973/71

[52] U.S. Cl.............. 62/95, 261/DIG. 11, 62/91, 62/121, 62/304, 62/305, 62/310
[51] Int. Cl............................................. F25d 17/06
[58] Field of Search.............. 62/304, 305, 121, 62/91, 310, 95; 261/DIG. 11

[56] References Cited
UNITED STATES PATENTS

| | | | |
|---|---|---|---|
| 2,017,027 | 10/1935 | Forrest.............................. | 62/121 |
| 2,498,017 | 2/1950 | Stutz................................. | 62/310 |
| 2,672,328 | 3/1954 | Mart............................. | 261/DIG. 11 |
| 3,052,105 | 9/1962 | Bowman............................. | 62/305 |
| 3,141,909 | 7/1964 | Mayo............................. | 261/DIG. 11 |
| 3,596,884 | 8/1971 | Murphy...................... | 261/DIG. 11 |
| 2,661,933 | 12/1953 | Deverall............................. | 62/305 |

FOREIGN PATENTS OR APPLICATIONS 1,039,271   5/1953   France.................. 62/310

Primary Examiner—William J. Wye
Attorney—Donald M. Wight, Charles E. Brown and Vincent L. Ramik

[57] ABSTRACT

Fluid is cooled by passing it through a horizontally or substantially horizontally elongated coil or tube-bundle heat exchanger unit and flowing cooling water over the surface of the said coil or tube-bundle from a plurality of distribution points spaced from one another along the length of the said coil or tube-bundle, each distribution point supplying water to cover only a predetermined limited portion of the length of the said coil or tube-bundle and recirculating the water from each distribution point over the said limited portion only.

8 Claims, 1 Drawing Figure

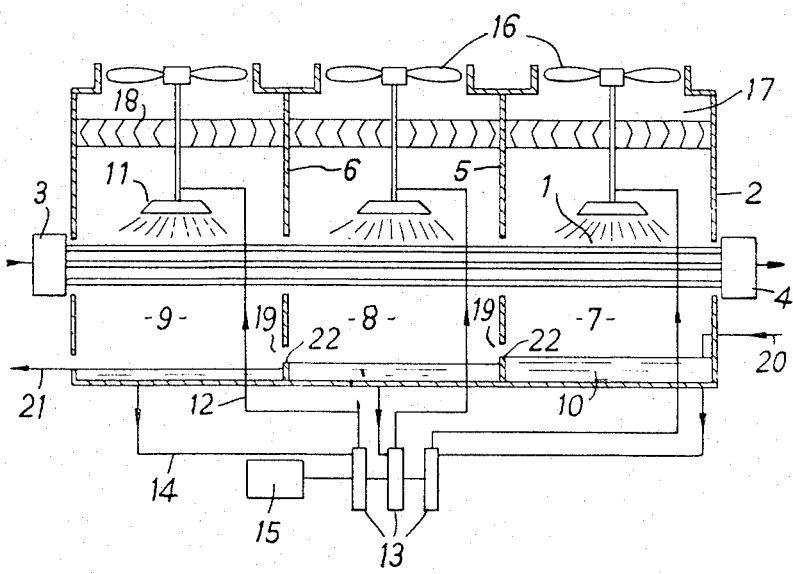

ART OF EVAPORATIVE COOLING

This invention relates to evaporative cooling, and particularly to a method and apparatus whereby fluid to be cooled is passed through a heat exchanger wherein it is cooled by a multi-stage countercurrent flow of cooling water.

Evaporative cooling procedures usually involve passing a fluid to be cooled through a heat exchanger in the form of a single or coiled tube or a bundle of parallel disposed tubes and spraying or otherwise flowing or trickling cooling water over the outer surface of the tube or tubes to effect cooling of the fluid passing through the heat exchanger by evaporation of the water on the tube or tubes. If necessary, or desirable, the evaporating process may be assisted by moving air over the surface of the tube and the water thereon by means of a fan, driven in any suitable manner.

In order, in the interests of economy, to minimise, as far as possible, the quantity of cooling water used to effect the evaporative cooling, the water initially flowing over the tube or tubes may be circulated a number of times over the said tube or tubes before finally passing to waste and fresh water supplied only in sufficient amount to compensate for the evaporation taking place. Such a recirculation procedure has, however, not hitherto proved very effective in practice largely owing to the fact that the equilibrium temperature attained by the cooling water will be too high towards the outlet end of the heat exchanger for any evaporative cooling effect to take place.

This will be the case equally with the use of a vertically tiered coiled-tube type of heat exchanger, in which the fluid to be cooled flows upwardly in countercurrent to the descending cooling water or with the use of a horizontal parallel tube-bundle-type of exchanger in which the water is circulated in a direction at right angles to the direction of flow of fluid through the tubes.

In the first case, the fluid passing through the exchanger tube will, by the time it reaches the upper or outlet end of the coil, have been cooled to a temperature which is lower than the equilibrium temperature attained by the circulating cooling water with the result that no further evaporative cooling action will take place over the upper portion of the coiled tube.

Similarly, in the case of a tube-bundle-type heat exchanger, in which fresh cooling water is sprayed or distributed over the entire length of the horizontal tube bundle and flows into a single sump, and is recirculated, the actual temperature of the sump water recirculated may be low enough to allow of effective evaporative cooling at the inlet end of the heat exchanger and over a substantial portion of the length thereof, but towards the outlet end thereof will be higher than the temperature of the already partly cooled fluid and consequently no further evaporative cooling action takes place over this portion.

The operator of such cooling plant thus has the choice of inefficient cooling using the recirculation technique or more efficient, but uneconomic, cooling by using a continuous supply of cooling water, which is used once only.

The present invention provides a method and apparatus which overcome the aforesaid disadvantages and which is both efficient and economical in use.

Accordingly the present invention provides a method of cooling fluid, which comprises passing the fluid to be cooled through a horizontally or substantially horizontally elongated coil or tube-bundle heat exchanger unit and flowing cooling water over the surface of the said coil or tube-bundle from a plurality of distribution points spaced from one another along the length of the said coil or tube-bundle, each distribution point supplying water to cover only a predetermined limited portion of the length of the said coil or tube-bundle and recirculating the water from each distribution point over the said limited portion only.

The invention also provides an evaporative cooling apparatus for carrying out the above method which apparatus comprises a horizontally or substantially horizontally elongated coil or tube-bundle heat exchanger adapted for the passage therethrough of fluid to be cooled, a plurality of cooling water distributors located above said coil or tube-bundle at spaced positions along the length thereof, a reservoir or sump located beneath said coil or tube-bundle at each of said positions, means for supplying cooling water from the said reservoir or sump to each of the said distributors and for causing water from each distributor to flow over and onto the surface of the said coil or tube-bundle over only a predetermined limited portion of the length thereof, and to collect in the associated sump and for continuously recirculating the water from the said sump to the pertaining distributor for reflowing over the said limited portion of the length of coil or tube-bundle only.

The distributor located at each of the aforesaid positions may be a water turbine, particularly a fan-driving turbine or it may be in the form of a fixed nozzle or a series of nozzles carried by a water supply pipe.

The means of supplying cooling water to each distributor is preferably a centrifugal pump driven in any suitable manner, such as by an electric motor.

The invention will be more particularly described with reference to the accompanying drawing which illustrates a preferred embodiment as applied to a heat exchanger of the tube-bundle type.

The apparatus illustrated in the accompanying drawing incorporates a heat exchanger which comprises a tube-bundle 1 mounted in a housing 2. The ends of the tubes extend outwardly from the housing and the fluid to be cooled enters the tubes at an inlet 3 and leaves from an outlet 4. The housing 2 has a number (two in the illustrated embodiment) of internal partitions 5, 6 which form a plurality of three separated compartments within the housing, each of which extends over a predetermined limited length of the tube-bundle 7, 8,9. The tube-bundle is located at some distance above the base of the housing, so as to provide in each compartment a reservoir or sump section 10 beneath the said tube-bundle for holding cooling water.

In each compartment, above the tube-bundle, is mounted a water distributor, preferably a water turbine 11, the nozzles of which are supplied, through a pipe 12, with cooling water from the sump or reservoir section in the pertaining compartment by means of a centrifugal pump 13 associated only with the said compartment. The cooling water is recirculated to each pump from the associated sump through pipe 14. Thus, each compartment is provided with its own independent means for continuously recirculating cooling water over the limited length of the tube-bundle enclosed by the said compartment. The centrifugal pumps 13 may each be driven by a separate electric motor or other driving means or, all the pumps may be coupled together for operation by a single motor 15.

Advantageously, the rotor of each turbine is drivingly coupled to a fan 16 located in the open upper end of each compartment for causing air to be drawn or forced through a plenum chamber 17 and drift eliminators 18, into the said compartment and over the tube-bundle therein to assist the evaporative action. In order to compensate for water evaporation in the compartments, the sumps are preferably in communication with one another through openings 19 located progressively nearer to the bottom of the sumps from the water inlet end 20 to the outlet end 21 of the housing and forming weirs 22 allowing flow of water from sump to sump.

The manner in which the above described apparatus is intended to function, will, it is thought, be readily appreciated.

Cooling water is first supplied to the reservoirs or sumps from a suitable source of supply and the centrifugal pumps are set in operation to feed water under pressure from these sumps to the individual turbine nozzles to cause rotation of the turbine rotors and consequent distribution of water over the tube-bundle lengths in each compartment. At the same time air is drawn over these tube-bundle lengths by rotation of the fans by the turbine rotors.

Fluid to be cooled enters the heat exchanger unit at one end and after passing through the constituent tubes issues from the other end of the exchanger unit. The cooling water flowing over the surface of the tube-bundle in each compartment from the associated turbine will be heated and will effect the cooling of the fluid passing through the tube-bundle by evaporation of the water film on the tube surface in known manner. The cooling water returning to the sump in each compartment will have attained an equilibrium temperature dependent on the temperature of the fluid passing through the said compartment and this temperature will be unaffected by the temperature of the water in any other compartment. As a consequence, on recirculation of the water in each compartment, an evaporative cooling action will continually take place in each compartment from the first compartment wherein the fluid is hottest to the last compartment adjacent the outlet from the heat exchanger wherein the fluid is at a considerably lower temperature, by reason of the fact that in no compartment is the equilibrium temperature of the water affected by the temperature of the water in any other compartment and consequently the temperature of the recirculated water will always be lower than the temperature of the fluid flowing through the pertaining tube-bundle length. Hence, by "staging" the water flow in accordance with the method of the invention, efficient cooling is attained with the use of the minimum quantity of water, as it only becomes necessary to supply further water sufficient to compensate for that lost by the evaporate action and "purge" to keep the salt concentration below the desired maximum.

Although in the above, one manner of carrying out the invention has been described by way of example, it is to be understood that modifications may be made thereto without departing from the scope of the invention. For example, the cooling water distributors need not be in the form of fan-driving turbines, but fixed pipes with outlet nozzles or openings may be used instead. If fans are used, these may be independently driven, for example, by an electric motor or motors. Moreover, the number of individual water distributing compartments provided over a tube-bundle exchanger of given length may be varied as desired.

I claim:

1. A method of cooling fluid, which comprises passing the fluid to be cooled through a horizontally or substantially horizontally elongated coil or tube-bundle heat exchanger unit and flowing cooling water over the surface of the said coil or tube-bundle from a plurality of distribution points spaced from one another along the length of the said coil or tube-bundle, each distribution point supplying water to cover and flow over only an associated predetermined limited portion of the length of the said coil or tube-bundle, recirculating the water from each distribution point over the said limited portion only, and maintaining the temperature of the recirculated water flowing from each of said distribution points substantially in equilibrium dependent on the temperature of the fluid passing through the respectively associated limited portions of said coil length.

2. A method according to claim 1, in which the recirculation of the cooling water is supplied from a reservoir or sump located beneath each of the said limited portions of the coil or tube-bundle.

3. An apparatus for cooling fluid comprising a horizontally or substantially horizontally elongated coil or tube-bundle heat exchanger for the passage therethrough of fluid to be cooled, a plurality of cooling water distributors located above said coil or tube-bundle at spaced positions along the length thereof, a separate reservoir or sump section located beneath said coil or tube-bundle at each of said positions, means for supplying cooling water from the said reservoir or sump sections to the associated distributors and for causing water from each distributor to flow over and onto the surface of the said coil or tube-bundle over only a predetermined limited portion of the length thereof below the associated distributor, and to collect in the associated sump section and for continuously recirculating the water from the said associated sump section to the pertaining distributors for reflowing over the said limited portion of the length of coil or tube-bundle only.

4. An apparatus according to claim 3, in which each of the cooling water distributors is a water turbine.

5. An apparatus according to claim 4, in which each water turbine is drivingly coupled to a fan located above the turbine.

6. An apparatus according to claim 3, in which the means for supplying cooling water to each distributor is a centrifugal pump.

7. An apparatus according to claim 3, in which the sumps are in communication with each other through weirs.

8. A method according to claim 2 in which the cooling water effects cooling of the coil or tube-bundle by evaporation.

* * * * *